United States Patent
Pitkethly et al.

(10) Patent No.: US 7,661,086 B1
(45) Date of Patent: *Feb. 9, 2010

(54) ENHANCED CLOCK SIGNAL FLEXIBLE DISTRIBUTION SYSTEM AND METHOD

(76) Inventors: Scott Pitkethly, 435 Avenue Del Ora, Redwood City, CA (US) 94062; Robert P. Masleid, 17266 Eaton La., Monte Sereno, CA (US) 95030

( * ) Notice: Subject to any disclaimer, the term of this patent is extended or adjusted under 35 U.S.C. 154(b) by 0 days.

This patent is subject to a terminal disclaimer.

(21) Appl. No.: 11/479,616

(22) Filed: Jun. 30, 2006

Related U.S. Application Data

(63) Continuation-in-part of application No. 11/171,668, filed on Jun. 30, 2005.

(51) Int. Cl.
*G06F 17/50* (2006.01)
*H01L 29/93* (2006.01)
*H01L 21/4763* (2006.01)

(52) U.S. Cl. .......................... 716/13; 716/12; 257/508; 257/691; 438/622

(58) Field of Classification Search ............. 716/12–13; 257/508, 691; 438/622
See application file for complete search history.

(56) References Cited

U.S. PATENT DOCUMENTS

| | | |
|---|---|---|
| 5,272,600 A | 12/1993 | Carey |
| 5,416,861 A | 5/1995 | Koh et al. |
| 5,640,049 A | 6/1997 | Rostoker et al. |
| 6,400,230 B2 | 6/2002 | Fairbanks |
| 6,522,186 B2 * | 2/2003 | O'Mahony et al. .......... 327/295 |
| 6,538,957 B2 | 3/2003 | Magoshi |
| 6,696,863 B2 | 2/2004 | Yamamoto et al. |
| 6,711,727 B1 | 3/2004 | Teig et al. |
| 6,769,104 B2 * | 7/2004 | Rodgers et al. ................ 716/6 |
| 6,934,924 B2 * | 8/2005 | Paul et al. ...................... 716/11 |
| 6,936,898 B2 | 8/2005 | Pelham et al. |
| 7,117,470 B1 * | 10/2006 | Teig et al. ...................... 716/11 |
| 7,216,322 B2 * | 5/2007 | Lai et al. ....................... 716/10 |
| 7,217,962 B1 | 5/2007 | Masleid |
| 2002/0162079 A1 | 10/2002 | Igarashi et al. |
| 2003/0127241 A1 * | 7/2003 | Russell et al. ............... 174/52.4 |
| 2003/0209766 A1 | 11/2003 | Blanchard |
| 2004/0044983 A1 * | 3/2004 | Dillon et al. ................... 716/21 |
| 2004/0107412 A1 * | 6/2004 | Pack et al. ..................... 716/19 |
| 2004/0153985 A1 * | 8/2004 | Paul et al. ...................... 716/10 |
| 2004/0210857 A1 * | 10/2004 | Srinivasan ...................... 716/2 |
| 2005/0023705 A1 | 2/2005 | Campbell et al. |
| 2005/0138593 A1 | 6/2005 | Okumura |
| 2005/0216877 A1 * | 9/2005 | Pack et al. ..................... 716/19 |

(Continued)

FOREIGN PATENT DOCUMENTS

TW 95123145 6/1995

(Continued)

OTHER PUBLICATIONS

Pitkethly; TRAN-P440; Clock Signal Distribution System and Method; U.S. Appl. No. 11/171,668; Filing Date: Jun. 30, 2005.

(Continued)

*Primary Examiner*—Stacy A Whitmore

(57) ABSTRACT

A diagonal offset clock signal distribution system and method are presented that facilitate maximized placement of a diagonal offset clock signal distribution tree.

19 Claims, 9 Drawing Sheets

U.S. PATENT DOCUMENTS

2005/0280159 A1    12/2005  Okumura
2007/0136707 A1*  6/2007  Teig et al. ...................... 716/6

FOREIGN PATENT DOCUMENTS

WO        2007/005691        1/2007

OTHER PUBLICATIONS

International Search Report Mail Date Nov. 24, 2006; PCT/US2006/025739; Filed Jun. 29, 2006.
International Preliminary Report on Patentability Mail Date Jan. 9, 2008; PCT/US2006/025739; Filed Jun. 29, 2006.
Non-Final Office Action dated Jul. 24, 2007; U.S. Appl. No. 11/171,668.
Final Office Action dated Apr. 4, 2008; U.S. Appl. No. 11/171,668.
Non-Final Office Action dated Aug. 26, 2008; U.S. Appl. No. 11/171,668.
Notice of Allowance dated Feb. 18, 2009; U.S. Appl. No. 11/171,668.
Ronan Farrell; IC Fabrication Technology; Solid State Electonics.
Etienne Moulin; IC Technology and Failure Mechanisms; Power Line; Jun. 2004.
Nobelprize.Org; The History of the Integrated Circuit; 2009.
Notice of Allowance Dated Jun. 5, 2009; U.S. Appl. No. 11/171,668.
Non-Final Office Action Dated Jul. 31, 2009; U.S. Appl. No. 11/477,970.
Advisory Action Dated Jun. 18, 2009; U.S. Appl. No. 11/477,970.
Final Office Action Dated Apr. 10, 2009; U.S. Appl. No. 11/477,970.
Non-Final Office Action Dated Nov. 4, 2008; U.S. Appl. No. 11/477,970.
Non-Final Office Action Dated Jul. 9, 2009; U.S. Appl. No. 11/274,098.
Final Office Action Dated Mar. 23, 2009; U.S. Appl. No. 11/274,098.
Non-Final Office Action Dated Oct. 7, 2008; U.S. Appl. No. 11/274,098.

* cited by examiner

200

200

500 ously owned and co-pending provisional patent

ENHANCED CLOCK SIGNAL FLEXIBLE DISTRIBUTION SYSTEM AND METHOD

RELATED APPLICATIONS

This patent is a continuation in part and claims the benefit of the commonly owned and co-pending provisional patent application Ser. No. 11/171,668 filed Jun. 30, 2005, entitled "A CLOCK SIGNAL DISTRIBUTION SYSTEM AND METHOD" which is hereby incorporated by this reference.

FIELD OF THE INVENTION

The present invention relates to the field of integrated circuit fabrication. More particularly the present invention relates to clock signal distribution in an integrated circuit.

BACKGROUND OF THE INVENTION

Electronic devices and systems have made a significant contribution towards the advancement of modern society and are utilized in a number of applications to achieve advantageous results. Numerous electronic technologies such as digital computers, calculators, audio devices, video equipment, and telephone systems have facilitated increased productivity and reduced costs in analyzing and communicating data, ideas and trends in most areas of business, science, education and entertainment. These electronic devices often include integrated circuits that perform variety of functions. In numerous implementations, operations performed by the integrated circuits are synchronized by clock signals. However, routing constraints can make clock signal distribution in conventional clock distribution systems a formidable task.

SUMMARY

A diagonal offset clock signal distribution system and method are presented that facilitate maximized placement of a diagonal offset clock signal distribution tree.

DRAWINGS

The accompanying drawings, which are incorporated in and form a part of this specification, illustrate embodiments of the invention by way of example and not by way of limitation. The drawings referred to in this specification should be understood as not being drawn to scale except if specifically noted.

DETAILED DESCRIPTION

Reference will now be made in detail to preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one ordinarily skilled in the art that the present invention may be practiced without these specific details. In other instances, well known methods, procedures, components, and circuits have not been described in detail as not to unnecessarily obscure aspects of the current invention.

The present invention has offset diagonal clock signal distribution path routes that facilitate high speed, low clock-skew clock distribution. In one exemplary implementation, the present invention offset diagonal distributions ensure endpoints are equidistant from central clock signal sources. Present invention diagonal clock signal distribution routes reduce relative distance from a primary driver to an endpoint compared to traditional clock signal distribution routes. Embodiments of the present invention also facilitate maximized placement of clock signal distribution routes in a single metal layer (e.g., a top metal layer).

Maximized placement of clock signal routes in a single layer facilitates realization of numerous increased performance advantages. Implementations of the present invention emphasize formation of the clock signal distribution tree in the single layer. A single layer route provides for a more uniform electrical medium (e.g., that is less influenced by process variations between the different layers). Placing clock distribution tree resources in the top metal layer can offer a number of advantages. For example, top metal layer emphasized implementations of the present invention can have one side exposed to air or plastic providing for less overall parasitic capacitance. The present invention offset diagonal clock signal distribution tree also facilitates convenient avoidance of other components included in a metal layer. For example, a present invention offset diagonal clock distribution tree facilitates the avoidance of pads in the top metal layer. Embodiments of the present invention can also enable reduced "doubling back" which can be relatively costly and impractical, especially if pads are conforming to an orthogonal array.

Figure 1:
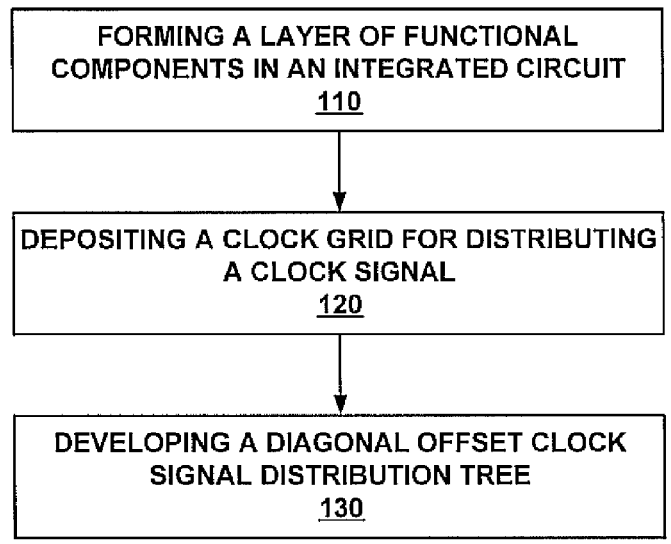
FIG. 1 is a flowchart of an exemplary integrated circuit clock distribution formation method in accordance with one embodiment of the present invention.

FIG. 1 is a flowchart of exemplary integrated circuit clock distribution formation method 100, in accordance with one embodiment of the present invention. Integrated circuit clock distribution formation method 100 facilitates maximized placement of clock signal distribution paths within a single layer. Clock signal distribution formation method 100 also provides a clock signal distribution arrangement in which clock signal delays and/or skews are minimized.

In step 110, a layer of clocked functional components is formed in an integrated circuit. A variety of different types of functional components can be formed in the layer, including synchronized functional components. For example, a number of functional component operations can be triggered or activated by a synchronizing clock signal.

In step 120, a clock grid mesh is deposited. The clock grid mesh distributes a clock signal to the clocked functional components. In one embodiment of the present invention, the clock grid mesh is oriented in either a vertical and/or horizontal orientation. Supplemental routes can be added to the clock grid to provide supplemental routes to adjacent grid lines. For example, supplemental horizontal routes can be added to vertical grid lines. In one exemplary implementation, the supplemental routes provided additional short paths for the clock signal.

In step 130, a diagonal offset clock signal distribution tree for distributing a clock signal to the clock grid is developed. The diagonal offset signal distribution tree provides a plurality of connections to vertical and/or horizontal paths in the clock grid. Opposing intermediate downstream branches of the diagonal offset clock signal distribution tree are offset on an intermediate upstream branch. In one embodiment, the paths form an offset Y distribution path configuration in which paths of the diagonal offset clock signal distribution tree do not come back on one another between two adjacent pads. In one exemplary implementation of the present invention, endpoints of the offset clock grid are equidistant from a central clock source.

In one embodiment of the present invention, development of the diagonal offset clock signal distribution tree is emphasized in a single layer. For example, as much of the diagonal offset clock signal distribution tree as possible is placed within a single layer. In one exemplary implementation, if two paths of the diagonal offset clock signal distribution tree have a routing conflict with one another and/or other components within the single layer the path of the diagonal offset clock signal distribution tree that is closest to the clock source is the path selected for routing to an alternate layer. Selecting the path closest to the clock source helps maintain symmetry in clock distribution paths for the clock signal and minimizes clock skew. For example, the path closest to the clock source can make metal jumping symmetrical through the clock distribution structure. In one embodiment of the present invention, the diagonal offset clock signal distribution tree is included in a top metal layer of an integrated circuit.

In one embodiment of the present invention, step 130 includes developing the diagonal offset clock signal distribution tree to cover a rectangular area.

In one embodiment, step 130 also includes inserting buffers in the diagonal offset clock signal distribution tree. In one exemplary implementation, a first size buffer is inserted in the diagonal offset clock signal distribution tree at a symmetrical intersection point and a second size buffer in the diagonal offset clock signal distribution tree at an asymmetrical intersection point. In one embodiment, buffers are utilized as drivers to facilitate load balancing. The buffers can be symmetrically configured but not necessarily the same size. In one exemplary implementation, the buffers are symmetrically configured with regards to location but not sized the same. In one exemplary implementation, different sized buffers are utilized to facilitate load balancing. The buffers on branches with half the load of other branches can be half the size.

Figure 2A:
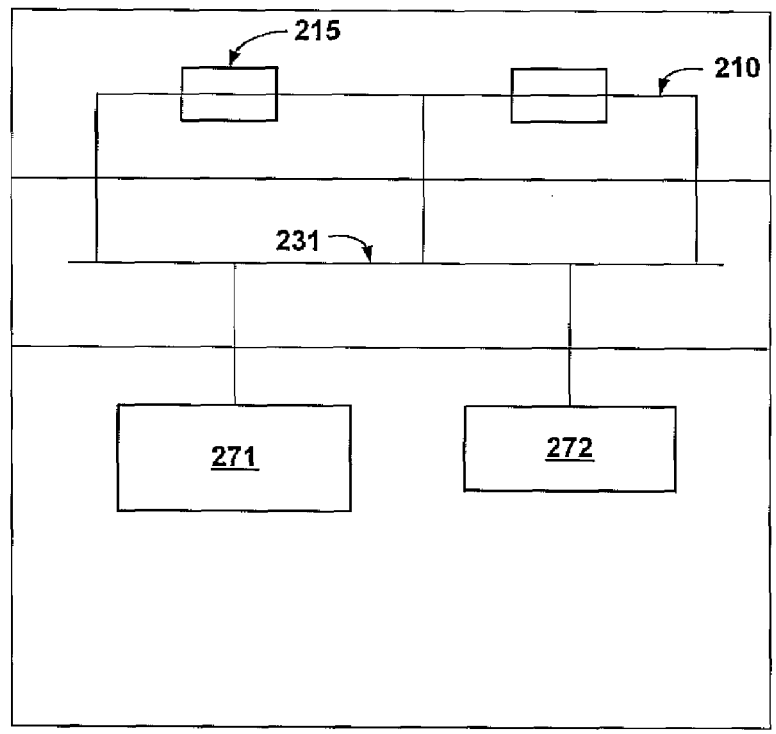
FIG. 2A is a block diagram side view of an exemplary integrated circuit clock signal distribution system in accordance with one embodiment of the present invention.

FIG. 2A is a block diagram side view of exemplary integrated circuit clock signal distribution system 200 in accordance with one embodiment of the present invention. Clock signal distribution system 200 includes a plurality of clocked components 271 and 272, a clock grid mesh 231, and a diagonal offset clock signal distribution tree 210. Clocked components 271 and 272 are communicatively coupled to clock grid mesh 231, which in turn is communicatively coupled to diagonal offset clock signal distribution tree 210. In one embodiment of the present invention, the plurality of clocked components 271 and 272 are formed in a substrate, clock grid mesh 231 is formed in a first layer, and a diagonal offset clock signal distribution tree 210 is formed in a second layer. In one exemplary implementation, diagonal offset clock signal distribution tree 210 is formed in a top metal layer.

The components of integrated clock signal distribution system 200 cooperatively operate to distribute clock signals. Clocked components 271 and 272 can perform a variety of functional operations. Clock grid mesh 231 distributes a clock signal to the clocked components. Diagonal offset clock signal distribution tree 210 distributes a clock signal to the clock grid mesh.

Figure 2B:
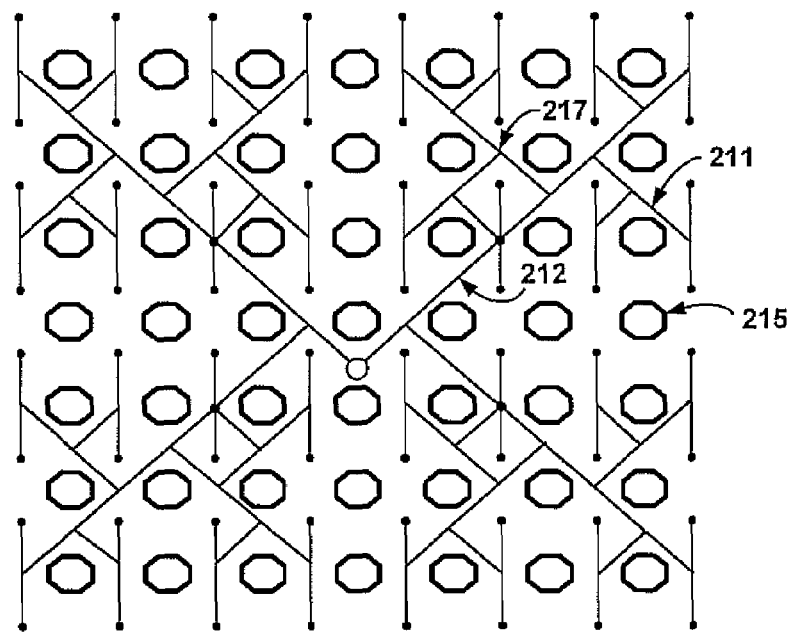
FIG. 2B is a block diagram top view of an exemplary integrated circuit clock signal distribution system in accordance with one embodiment of the present invention.

FIG. 2B is a block diagram top view of exemplary integrated circuit clock signal distribution system 200 in accordance with one embodiment of the present invention. Opposing intermediate downstream branches of the diagonal offset clock signal distribution tree are offset on an intermediate upstream branch. For example, intermediate diagonal downstream branches 211 and 217 of the diagonal offset clock signal distribution tree 210 are offset from one another on intermediate upstream branch 212. Diagonal offset clock signal distribution tree 210 forms a uniform array of end points that deliver clock signals to clock grid 230, wherein endpoints of the diagonal offset clock signal distribution tree are equidistant from a central clock point. In one embodiment, diagonal offset clock signal distribution tree 210 is included in a top metal layer of an integrated circuit.

The offsets in diagonal offset clock signal distribution tree 210 can be arranged (e.g., configured) to avoid other components in the same layer as diagonal offset clock signal distribution tree 210. In one exemplary implementation, integrated circuit clock signal distribution system 200 includes pads 215 for communicatively coupling external components to a power distribution grid (not shown). The offset in the diagonal branches of diagonal offset clock signal distribution tree 210 are wider than the pads permitting the clock signal to be distributed around the pads. In one embodiment, diagonal offset clock signal distribution tree 210 is included in the same layer as a power grid. For example, diagonal offset clock signal distribution tree 210 and the power grid are included in a top metal layer of an integrated circuit. The power distribution grid distributes power to the plurality of clocked components 271 and 272.

In one embodiment of the present invention, photolithography is utilized to form clock signal distribution system. For example, a photolithographic mask template of an offset Y configuration is used to form a diagonal offset clock signal distribution tree.

Figure 3A:
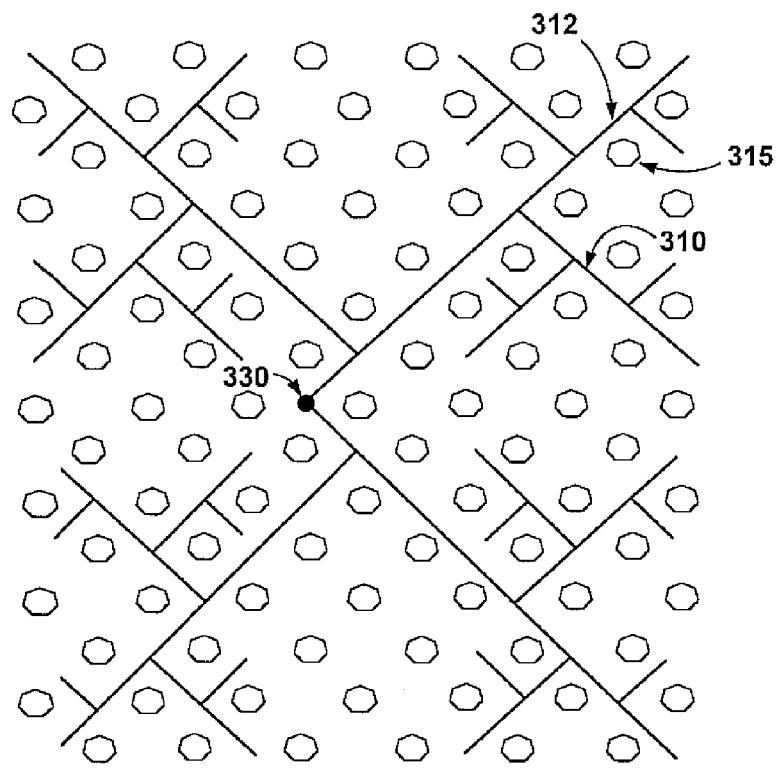
FIG. 3A is a block diagram top view of exemplary integrated circuit clock signal distribution system in accordance with one embodiment of the present invention.
Figure 3B:
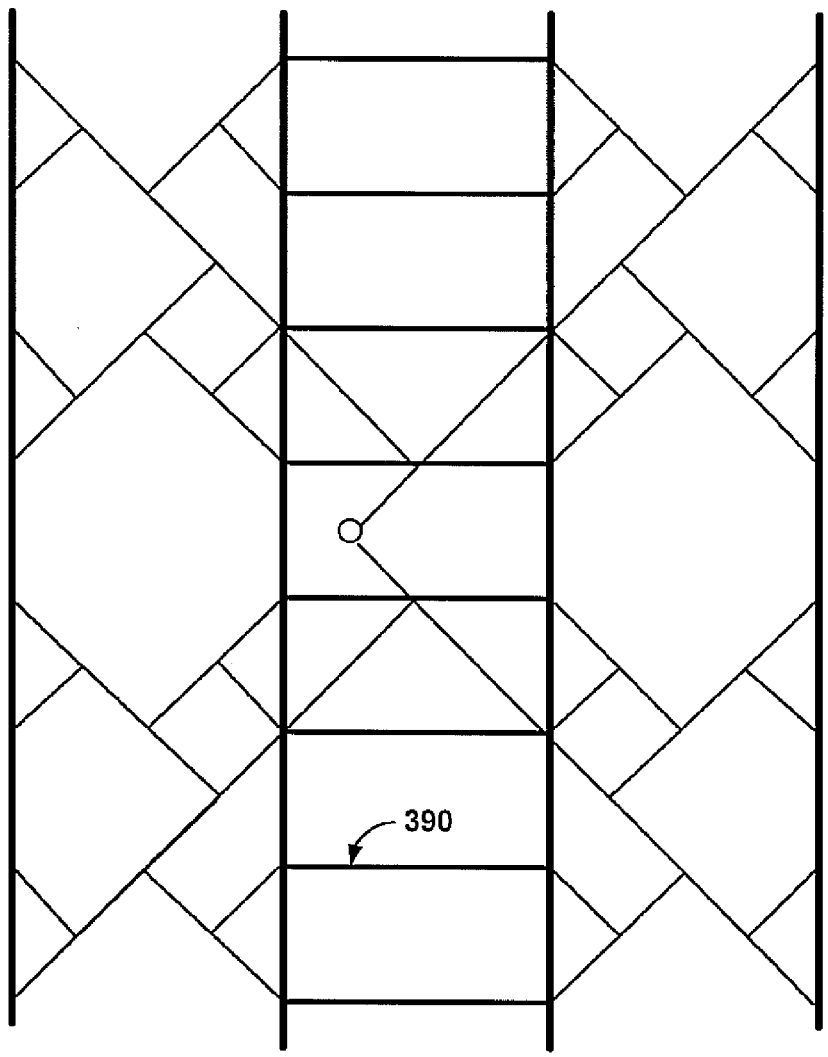
FIG. 3B is a block diagram illustrating the endpoint connections of an exemplary integrated circuit clock signal distribution system in accordance with one embodiment of the present invention.

It is appreciated that present invention systems and methods are readily adaptable to cover a variety of configurations. FIG. 3A is a block diagram top view of exemplary integrated circuit clock signal distribution system 300 in accordance with one embodiment of the present invention. Integrated circuit clock signal distribution system 300 is similar to integrated circuit clock signal distribution system 200. Opposing intermediate downstream branches (e.g., 310) of the diagonal offset clock signal distribution tree are offset on an intermediate upstream branch (e.g., 312) and avoid pads (e.g., 315). The diagonal offset clock signal distribution tree of integrated circuit clock signal distribution system 300 includes a uniform symmetrical array of end points which are equidistant from a central clock point (e.g., 330). The diagonal offset clock signal distribution tree delivers clock signals to a clock grid (not shown). FIG. 3B is a block diagram illustrating the endpoint connections of integrated circuit clock signal distribution system 300 in accordance with one embodiment of the present invention. In one embodiment, the diagonal offset components of clock signal distribution tree 310 are included in a top metal layer of an integrated circuit and vertical components are spines in a clock mesh or grid on a second metal layer. In one exemplary implementation, the spines are shorted together. The spines can be shorted together in locations where there is no "local" distribution tree (e.g. 390).

Figure 4:
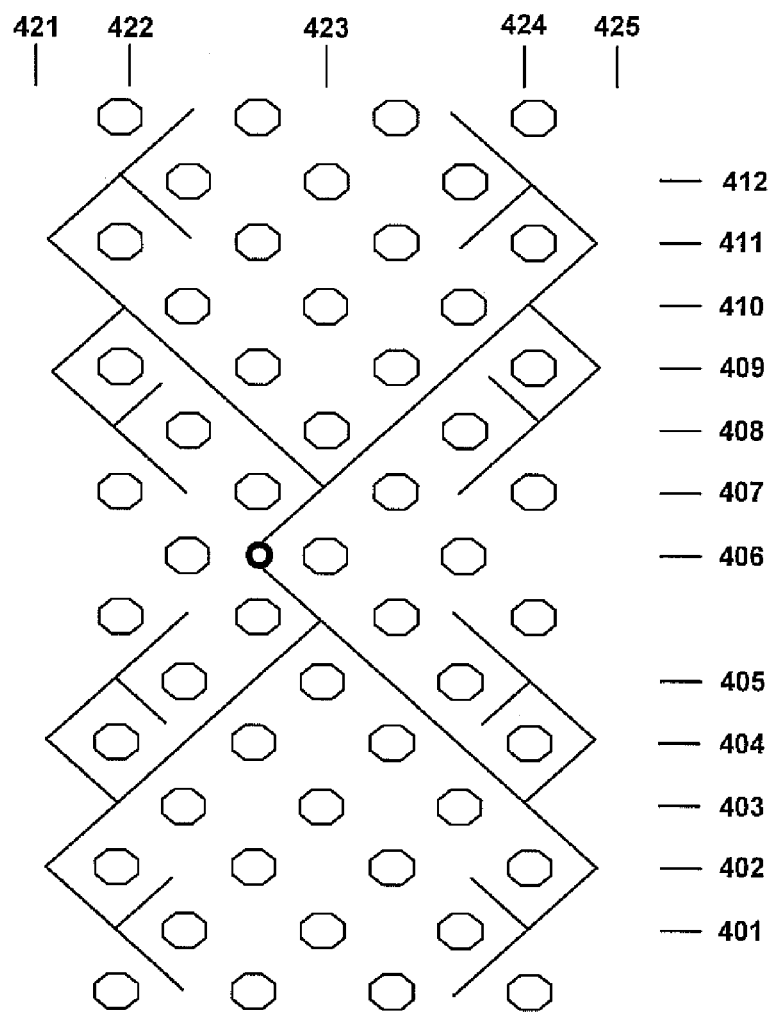
FIG. 4 is a block diagram top view of exemplary integrated circuit clock signal distribution system covering a rectangular area in accordance with one embodiment of the present invention.

FIG. 4 is a block diagram top view of exemplary integrated circuit clock signal distribution system 400 covering a rectangular area in accordance with one embodiment of the present invention. Integrated circuit clock signal distribution system 400 is similar to integrated circuit clock signal distribution system 200 and 300 except it covers a rectangular area and has a different number of branches in different orientations. In one exemplary implementation there are eleven branches in a vertical orientation and five branches in a horizontal orientation. Opposing intermediate downstream branches of the diagonal offset clock signal distribution tree are offset on an intermediate upstream branch. The diagonal offset clock signal distribution tree of integrated circuit clock signal distribution system 400 also includes a uniform symmetrical array of end points which are equidistant from a central clock point. Again, the diagonal offset clock signal distribution tree can be included in a single metal layer of an integrated circuit.

Figure 5A:
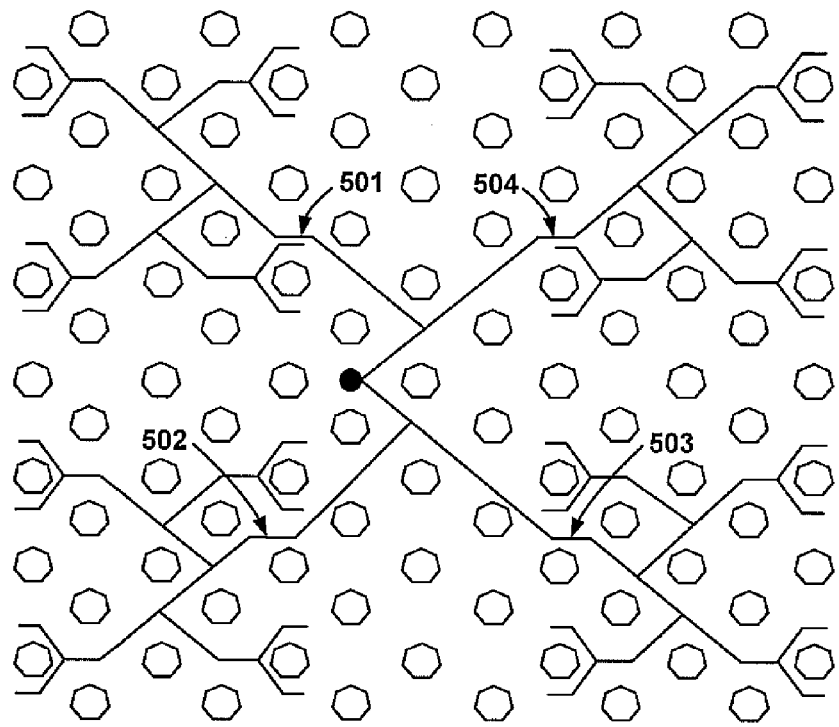
FIG. 5A is a block diagram top view of exemplary integrated circuit clock signal distribution system including orthogonal jogs in accordance with one embodiment of the present invention.

FIG. 5A is a block diagram top view of exemplary integrated circuit clock signal distribution system 500 covering a rectangular in accordance with one embodiment of the present invention. Integrated circuit clock signal distribution system 500 is similar to integrated circuit clock signal distribution system 200; 300 and 400 except it includes orthogonal jogs. Opposing intermediate downstream branches of the diagonal offset clock signal distribution tree are again offset on an intermediate upstream branch. The diagonal offset clock signal distribution tree of integrated circuit clock signal distribution system 500 also includes a uniform symmetrical array of end points which are equidistant from a central clock point. In one embodiment, diagonal offset clock signal distribution tree 500 is included in a top metal layer of an integrated circuit.

The offsets in diagonal offset clock signal distribution tree of integrated circuit clock signal distribution system 500 includes horizontal jogs (e.g., 501, 502, 503, 504, etc.) to compensate for different angles and facilitate avoiding other components in the same layer as the diagonal offset clock signal distribution tree. In one embodiment, the orthogonal jogs compensate for the difference in a first orientation distance between pads from a second orientation distance between pads. In one exemplary implementation, the orthogonal jogs are in a single orientation (e.g., "horizontal"). The offset in the diagonal branches and the orthogonal jogs are "wider" than the pads permitting the clock signal to be distributed around the pads. It is appreciated that the orthogonal jogs can be implemented in a variety of configurations. For example, the orthogonal jogs can be the same length or different length.

In one embodiment, the orthogonal jogs are placed at regular intervals in the distribution tree. In one exemplary implementation, the interval is equal to the pad separation in the short-direction (the width) of the rectangular are receiving the clock. This facilitates reduction in the number of length-wise jogs while keeping an increased number of diagonal tracks between pads. The tracks can be helpful if a clock doubles back on itself.

Figure 5B:
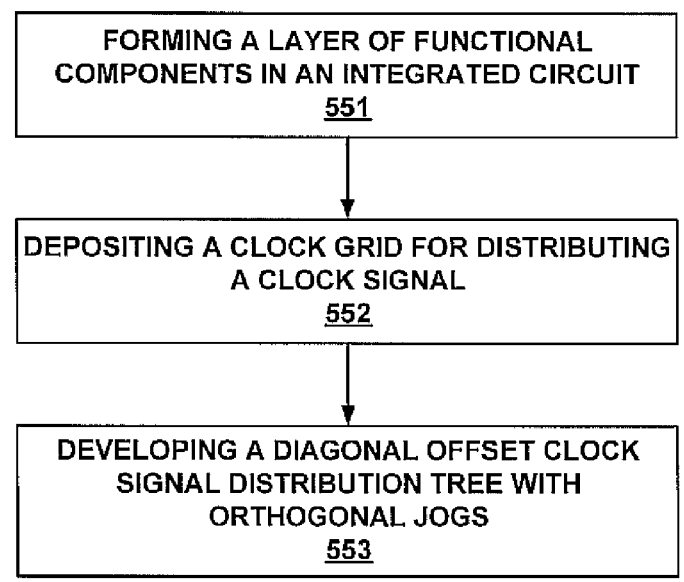
FIG. 5B is a flow chart of exemplary integrated circuit clock distribution formation method for covering a rectangular area utilizing orthogonal jogs in accordance with one embodiment of the present invention.

FIG. 5B is a flow chart of exemplary integrated circuit clock distribution formation method 550 for covering a rectangular area in accordance with one embodiment of the present invention. Integrated circuit clock distribution formation method 550 is similar to integrated circuit clock distribution formation method 100 except it includes orthogonal jog previsions.

In step 551, a layer of clocked functional components is formed in an integrated circuit. Again, a variety of different types of functional components can be formed in the layer, including synchronized functional components and a number of functional component operations can be triggered or activated by a synchronizing clock signal.

In step 552, a clock grid mesh is deposited. The clock grid mesh distributes a clock signal to the clocked functional components. In one embodiment of the present invention, the clock grid mesh is similar to a clock grid mesh deposited in step 120 of FIG. 1.

In step 530, a diagonal offset clock signal distribution tree for distributing a clock signal to the clock grid is developed including orthogonal jogs. In one exemplary implementation, the diagonal offset clock signal distribution tree covers a rectangular area. Opposing intermediate downstream braches of the diagonal offset clock signal distribution tree are offset on an intermediate upstream branch and the paths of the diagonal offset clock signal distribution tree do not come back on one another between two adjacent pads. In one exemplary implementation of the present invention, endpoints of the offset clock grid are equidistant from a central clock source. In one embodiment, the distribution tree is initially laid out with relatively wider spacing and then "shrunk" back down to facilitate minimization of distance between endpoints.

Figure 6:
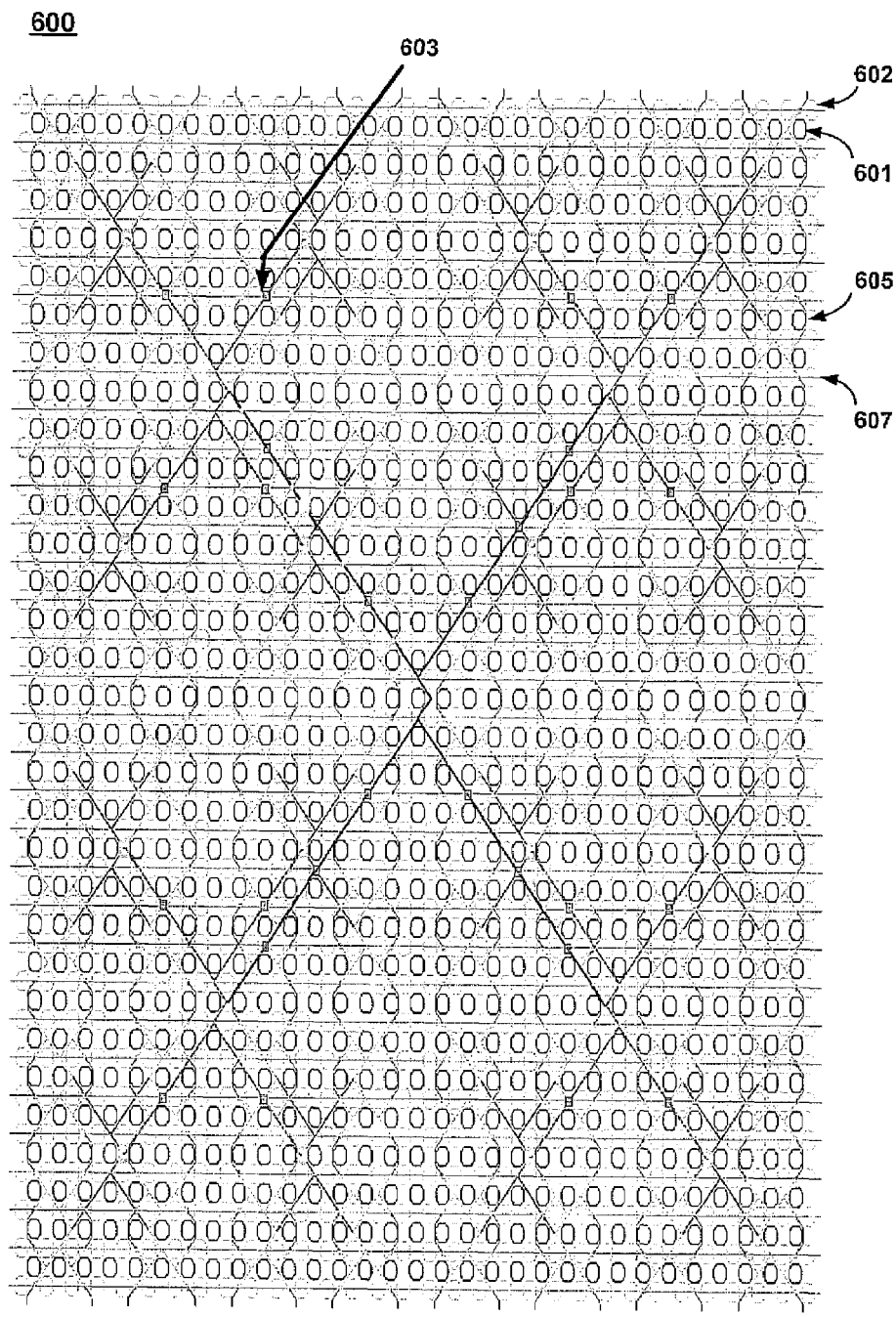
FIG. 6 is a block diagram top view of an exemplary "expanded" integrated circuit clock signal distribution system in accordance with one embodiment of the present invention.

It is appreciated that the present invention is readily adaptable to a variety of different configurations and implementations. FIG. 6 is a block diagram top view of an exemplary "expanded" integrated circuit clock signal distribution system 600 in accordance with one embodiment of the present invention. In one embodiment, "expanded" integrated circuit clock signal distribution system 600 is similar to integrated circuit clock signal distribution system 200, 300 and 400 except it covers a wider area of an integrated chip. In one exemplary implementation, "expanded" integrated circuit clock signal distribution system 600 includes a diagonal offset clock signal distribution tree component in each quadrant that is similar to a diagonal offset clock signal distribution tree 210. Each of the quadrant diagonal offset clock signal distribution tree components are coupled by upstream branches (e.g., "expansion branches") of the diagonal offset clock signal distribution tree included in integrated circuit clock signal distribution system 600. In one embodiment, diagonal offset clock signal distribution tree branches of integrated circuit clock signal distribution system 600 includes "dips" (e.g., 603) to a different metal layer. In one exemplary implementation, the "dips" from a first metal layer to a second metal layer and back again are utilized to avoid a component in the first metal layer.

In one embodiment, integrated circuit clock signal distribution system 600 also includes pads that are in a first metal layer (e.g., 601) and pads that traverse between the first metal layer and second metal layer (e.g., 602). The diagonal offset clock signal distribution tree branches of integrated circuit clock signal distribution system 600 avoids the pads that traverse between the first metal layer and second metal layer similar to integrated circuit clock signal distribution system 300. The diagonal offset clock signal distribution tree branches feed to end points coupled to spines (e.g., 607) of a clock mesh grid in the second metal layer and the spines are selectively shorted together. In one exemplary implementation, The diagonal offset clock signal distribution tree branches of integrated circuit clock signal distribution system 600 avoids the pads that are in the first metal layer by use of the diagonal offsets and selectively shorting (e.g., 605) "around" the pads.

Thus, the present invention facilitates efficient and effective clock signal distribution while minimizing delays and skews. Present invention diagonal clock signal distribution routes reduce relative distance from the driver to the endpoint compared to traditional non-diagonal clock signal distribution routes. Embodiments of the present invention also facilitate maximized placement of clock signal distribution routes in a single metal layer (e.g., a top metal layer) while providing for a more uniform electrical medium with less overall parasitic capacitance. The present invention offset diagonal clock signal distribution tree also facilitates minimized doubling back in clock distribution paths and convenient avoidance of other components included in a metal layer. Present invention systems and methods can also be readily adapted to cover different area configurations including square and rectangle.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. An integrated circuit clock distribution system comprising:
    a plurality of clocked components;
    a clock grid mesh for distributing a clock signal to said clocked components; and
    a diagonal offset clock signal distribution tree for distributing said clock signal to said clock grid mesh, wherein a diagonal offset of said diagonal offset clock signal distribution tree includes an orthogonal jog at a regular interval with respect to another orthogonal jog and said interval equals a separation in a relatively shorter distance between pads in a first orientation as compared to a relatively longer distance between pads in a second orientation, wherein paths of said diagonal offset clock signal distribution tree do not come back on one another between two adjacent pads, wherein said diagonal offset clock signal distribution tree and a power distribution grid are included in a top single metal layer of an integrated circuit.

2. An integrated circuit clock distribution system of claim 1 wherein opposing intermediate downstream branches of said diagonal offset clock signal distribution tree are diagonally offset on an intermediate upstream branch and said opposing intermediate down stream branches include said orthogonal jog.

3. An integrated circuit clock distribution system of claim 2 further comprising a pad for communicatively coupling external components to a power distribution grid, wherein said diagonal offset and said orthogonal jog are wider than said pad.

4. An integrated circuit clock distribution system of claim 1 wherein said top single metal layer includes a plurality of pads and a first orientation distance between pads is different from a second orientation distance between pads.

5. An integrated circuit clock distribution system of claim 1 wherein said diagonal offset clock signal distribution tree forms a uniform array of end points that said clocked components are tapped into.

6. An integrated circuit clock distribution system of claim 1 wherein said orthogonal jog is equal length to another orthogonal jog.

7. An integrated circuit clock distribution formation method:
    forming a layer of clocked functional components in an integrated circuit;
    depositing a clock grid mesh for distributing a clock signal to said clocked functional components; and
    developing a diagonal offset clock signal distribution tree with an orthogonal jog for distributing said clock signal to said clock grid mesh, wherein said orthogonal jog is at a regular interval with respect to another orthogonal jog and said interval equals a separation in a relatively shorter distance between pads in a first orientation as compared to a relatively longer distance between pads in a second orientation, wherein paths of said diagonal offset clock signal distribution tree do not come back on one another between two adjacent pads, wherein said diagonal offset clock signal distribution tree and a power distribution grid are included in a top single metal layer of said integrated circuit.

8. An integrated circuit clock distribution formation method of claim 7 wherein said orthogonal jog is arranged in an orientation different from another orthogonal jog.

9. An integrated circuit clock distribution formation method of claim 7 further comprising shrinking down spacing between pads.

10. An integrated circuit clock distribution formation method of claim 7 wherein endpoints of said diagonal offset clock signal distribution tree are equidistant from a central clock source.

11. An integrated circuit clock distribution formation method of claim 7 wherein a diagonal offset and said orthogonal jog of said diagonal offset clock signal distribution tree avoid pads.

12. An integrated circuit clock distribution system comprising:
    a plurality of clocked components;
    a clock grid mesh for distributing a clock signal to said clocked components; and
    a diagonal offset clock signal distribution tree for distributing said clock signal to said clock grid mesh, a first number of branch points in a first orientation are different from a second number of branch points in a second orientation, wherein a diagonal offset of said diagonal offset clock signal distribution tree includes an orthogonal jog at a regular interval with respect to another orthogonal jog and said interval equals a separation in a relatively shorter distance between pads in a first orientation as compared to a relatively longer distance between pads in a second orientation, wherein paths of said diagonal offset clock signal distribution tree do not come back on one another between two adjacent pads, wherein said diagonal offset clock signal distribution tree and a power distribution grid are included in a top single metal layer of said integrated circuit.

13. An integrated circuit clock distribution system of claim 12 wherein opposing intermediate downstream branches of said diagonal offset clock signal distribution tree are offset on an intermediate upstream branch.

14. An integrated circuit clock distribution system of claim 12 wherein said diagonal offset clock signal distribution tree includes buffers for driving said clock signal.

15. An integrated circuit clock distribution system of claim 14 wherein a first one of said buffers has a different driving capacity than a second one of said buffers.

16. An integrated circuit clock distribution system of claim 15 wherein said first one of said buffers is located at a diagonal intersection point of said diagonal offset clock signal distribution tree that goes in two directions and said second one of said buffers is located at a diagonal intersection point of said diagonal offset clock signal distribution tree that goes in one direction.

17. An integrated circuit clock distribution formation method:
forming a layer of clocked functional components in an integrated circuit;
depositing a clock grid mesh for distributing a clock signal to said clocked functional components; and
developing a diagonal offset clock signal distribution tree for distributing said clock signal to said clock grid mesh, wherein said diagonal offset clock signal distribution tree covers a rectangular area, wherein a diagonal offset of said diagonal offset clock signal distribution tree includes an orthogonal jog at a regular interval with respect to another orthogonal jog and said interval equals a separation in a relatively shorter distance between pads in a first orientation as compared to a relatively longer distance between pads in a second orientation, wherein paths of said diagonal offset clock signal distribution tree do not come back on one another between two adjacent pads, wherein said diagonal offset clock signal distribution tree and a power distribution grid are included in a top single metal layer of said integrated circuit.

18. An integrated circuit clock distribution formation method of claim 17 further comprising inserting a first size buffer in said diagonal offset clock signal distribution tree at a symmetrical intersection point and a second size buffer in said diagonal offset clock signal distribution tree at an asymmetrical intersection point.

19. An integrated circuit clock distribution formation method of claim 17 wherein a first endpoint of said diagonal offset clock signal distribution tree and a second endpoint of said diagonal offset clock signal distribution tree are equidistant from a central clock source.

* * * * *